(12) United States Patent
Nakamura et al.

(10) Patent No.: US 10,676,102 B2
(45) Date of Patent: Jun. 9, 2020

(54) CONTROL SYSTEM FOR HYBRID VEHICLE (71) Applicant: HONDA MOTOR CO., LTD., Tokyo (JP)

(72) Inventors: Naoki Nakamura, Wako (JP); Shinji Takuno, Wako (JP); Masanori Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 15/872,475

(22) Filed: Jan. 16, 2018

(65) Prior Publication Data
US 2018/0208214 A1 Jul. 26, 2018

(30) Foreign Application Priority Data
Jan. 24, 2017 (JP) .................. 2017-010509

(51) Int. Cl.
*B60W 50/14* (2020.01)
*B60W 20/40* (2016.01)
(Continued)

(52) U.S. Cl.
CPC ............ *B60W 50/14* (2013.01); *B60K 6/387* (2013.01); *B60K 6/442* (2013.01); *B60W 10/02* (2013.01); *B60W 10/026* (2013.01); *B60W 10/06* (2013.01); *B60W 20/40* (2013.01); *B60W 20/50* (2013.01); *B60W 50/0205* (2013.01);
(Continued)

(58) Field of Classification Search
CPC ...... B60W 50/14; B60W 10/02; B60W 20/50; B60W 50/0205; B60W 10/06; B60W 10/026; B60W 20/40; B60W 2050/021; B60W 2510/0685; B60W 2510/0208; B60W 2710/021; B60W 2510/0638; B60W 2050/143; B60W 20/00; B60K 6/387; B60K 6/442; F02D 41/02; F02D 41/22; F02D 2041/228; F02D 2200/024;
(Continued)

(56) References Cited

U.S. PATENT DOCUMENTS 6,571,157 B1 * 5/2003 Dahlin ................ B60K 1/02
701/22
7,631,710 B2 * 12/2009 Utsumi .............. F02D 29/02
123/179.3
(Continued)

FOREIGN PATENT DOCUMENTS

JP       2003336514 A    11/2003

*Primary Examiner* — Russell Frejd
(74) *Attorney, Agent, or Firm* — Armstrong Teasdale LLP (57) ABSTRACT

Provided is a control system (1) for a hybrid vehicle (8) which is configured to directly transmit an output of an internal combustion engine (2) to a driven wheel (17) via a lockup clutch (18) and transmit an output of an electric motor is to the driven wheel by disengaging the lockup clutch depending on an operating state of the vehicle. The control system is configured to activate a warning unit (36, 37) when the oil pressure is below a prescribed oil pressure threshold value and the rotational speed of the engine detected by the rotary encoder is higher than a rotational speed threshold value. The rotational speed threshold value is a first threshold value when the lockup clutch is fully disengaged, and a second threshold value higher than the first threshold value when the lockup clutch is fully engaged, being engaged and being disengaged.

7 Claims, 10 Drawing Sheets

(51) Int. Cl.
*B60W 10/02* (2006.01)
*B60W 10/06* (2006.01)
*F01M 11/12* (2006.01)
*F02D 41/22* (2006.01)
*F01M 1/20* (2006.01)
*F02D 41/02* (2006.01)
*B60W 50/02* (2012.01)
*B60W 20/50* (2016.01)
*B60K 6/442* (2007.10)
*B60K 6/387* (2007.10)

(52) U.S. Cl.
CPC .............. *F01M 1/20* (2013.01); *F01M 11/12* (2013.01); *F02D 41/022* (2013.01); *F02D 41/22* (2013.01); *B60W 2050/021* (2013.01); *B60W 2050/143* (2013.01); *B60W 2510/0208* (2013.01); *B60W 2510/0638* (2013.01); *B60W 2510/0685* (2013.01); *B60W 2710/021* (2013.01); *F02D 2041/228* (2013.01); *F02D 2200/024* (2013.01); *F02D 2200/101* (2013.01); *F16N 2250/04* (2013.01); *Y10S 903/912* (2013.01)

(58) Field of Classification Search
CPC .... F02D 2200/101; F01M 1/20; F01M 11/12; F16N 2250/04; Y10S 903/912
See application file for complete search history.

(56) References Cited

U.S. PATENT DOCUMENTS

| | | | | |
|---|---|---|---|---|
| 8,298,117 | B2* | 10/2012 | Seel | B60K 6/48 |
| | | | | 477/5 |
| 8,646,313 | B2* | 2/2014 | Gale | F04B 51/00 |
| | | | | 73/37 |
| 9,855,833 | B2* | 1/2018 | Gale | B60K 6/445 |
| 2012/0245785 | A1* | 9/2012 | Tamagawa | B60W 10/26 |
| | | | | 701/22 |
| 2014/0025247 | A1* | 1/2014 | Tamagawa | B60W 10/10 |
| | | | | 701/22 |
| 2014/0074345 | A1* | 3/2014 | Gabay | G07C 5/08 |
| | | | | 701/31.4 |

* cited by examiner

CONTROL SYSTEM FOR HYBRID VEHICLE

TECHNICAL FIELD

The present invention relates to a control system for a hybrid vehicle, and in particular to a control system for a hybrid vehicle that can perform oil pressure warning of an internal combustion engine of the vehicle in a favorable manner.

BACKGROUND ART

It is known to measure the pressure of lubricating oil in an internal combustion engine, and to issue a warning when the measured oil pressure falls below a prescribed threshold value. See JP4235485B, for instance. The control system disclosed in this prior patent document issues a warning when the oil pressure falls below a prescribed threshold value provided that the engine is in operation, and the rotational speed of the engine is higher than a prescribed threshold value. The rotational threshold value is selected at a lowest possible level that can occur when the engine is in operation.

When measuring the oil pressure of an engine, it is necessary to take into account the rotational speed of the engine. When the rotational speed of the engine drops below a prescribed level, because the oil pressure is created by a pump actuated by the rotation of the crankshaft, the oil pressure drops. But this should be distinguished from the actual case of a drop in oil pressure that should be warned about. Therefore, it is essential to take into account the rotational speed of the engine when an oil pressure warning is to be made.

The rotational speed of an engine is typically measured by using a rotary encoder that counts crank pulses obtained by detecting the passing of projections formed on a crank pulser rotor attached to the crankshaft of the engine near a magnetic detector. Thus, the rotary encoder detects the rotational speed of the crankshaft according to the number of pulses counted during a prescribed sampling time. Since the measurement is based on the number of pulses preceding the current time point, as opposed to an instantaneous value, a certain time delay is inevitable in the measured value. In particular, when the rotational speed changes rapidly, a significant deviation from the actual rotational speed may occur owing to this time delay.

SUMMARY OF THE INVENTION

In view of such a problem of the prior art, a primary object of the present invention is to provide a control system for a hybrid vehicle that can issue an oil pressure warning correctly at all times.

A second object of the present invention is to provide a control system for a hybrid vehicle that can issue an oil pressure warning without any significant delay.

To achieve such an object, the present invention provides a control system (1) for a hybrid vehicle (8), the hybrid vehicle being configured to operate in a direct drive mode where an output of an internal combustion engine (2) is directly transmitted to a driven wheel (17) via a lockup clutch (18) and a hybrid drive mode and/or an electric drive mode where the lockup clutch is disengaged, and an output of an electric motor (3) is transmitted to the driven wheel depending on an operating state of the vehicle including a rotational speed of the engine, the control system comprising: an oil pressure sensor (13) for detecting a pressure of lubricating oil for the engine; a rotary encoder (48) for detecting the rotational speed of the engine; a clutch sensor (28) for detecting a state of the lockup clutch; and a warning unit (36, 37) for providing a visual and/or acoustic warning to a vehicle operator; the control system being configured to activate the warning unit when the oil pressure detected by the oil pressure sensor is below a prescribed oil pressure threshold value and the rotational speed of the engine detected by the rotary encoder is equal to or higher than a rotational speed threshold value, the rotational speed threshold value being varied depending on the state of the lockup clutch detected by the clutch sensor.

By varying the rotational speed threshold value for activating the oil pressure warning depending on the state of the lockup clutch or in particular by raising the rotational speed threshold value for activating the oil pressure warning depending on the state of the lockup clutch, an improper activation of the oil pressure warning owing to a delay in detecting the rotational speed of the engine can be avoided.

Preferably, the rotational speed threshold value is a first threshold value when the lockup clutch is fully disengaged, and a second threshold value higher than the first threshold value when the lockup clutch is fully engaged, being engaged and being disengaged.

Thereby, even when a sudden brake is applied to the vehicle operating in the direct drive mode, by using a higher rotational speed threshold value, the activation of the oil pressure warning can be appropriately suppressed.

Preferably, the hybrid vehicle is configured to stop the engine when the rotational speed of the engine falls below a prescribed lower threshold value, the first threshold value being substantially equal to the lower threshold value.

In a hybrid vehicle, there is a lower limit of the rotational speed for the engine to be in operation. By using this lower limit value for the first rotational speed threshold value, the reliability of the oil pressure warning can be increased, and the control process can be simplified.

According to a preferred embodiment of the present invention, the hybrid vehicle is configured such that the lockup clutch is engaged when the rotational speed of the engine is equal to or higher than a prescribed higher threshold value and is disengaged when the rotational speed of the engine is lower than the higher threshold value, the second threshold value being substantially equal to the higher threshold value.

By raising the second rotational speed threshold value to a level as high as practically possible, the improper activation of the oil pressure warning can be prevented in an optimum fashion. By coinciding the second threshold value with the higher threshold value, the control process can be simplified.

The control system may further comprise a first timer for suppressing the warning until a first time period has elapsed from a time of a restart of the engine.

Thereby, the activation of the oil pressure warning owing to an unstable state of the engine at the time of a restart can be avoided.

The control system may further comprise a second timer for suppressing the warning until a second time period has elapsed from a time of detecting a drop of the oil pressure below the oil pressure threshold value.

Thereby, the activation of the oil pressure warning owing to a temporary oil pressure drop or an oil pressure drop of a short time duration can be avoided.

The control system may further comprise a third timer for suppressing the warning until a third time period has elapsed from a time of a startup of the vehicle.

Thereby, the activation of the oil pressure warning owing to an unstable state of the engine at the time of a startup can be avoided.

DESCRIPTION OF THE PREFERRED EMBODIMENT(S)

A control system for a hybrid vehicle according to an embodiment of the present invention is described in the following with reference to the appended drawings.

Figure 1:
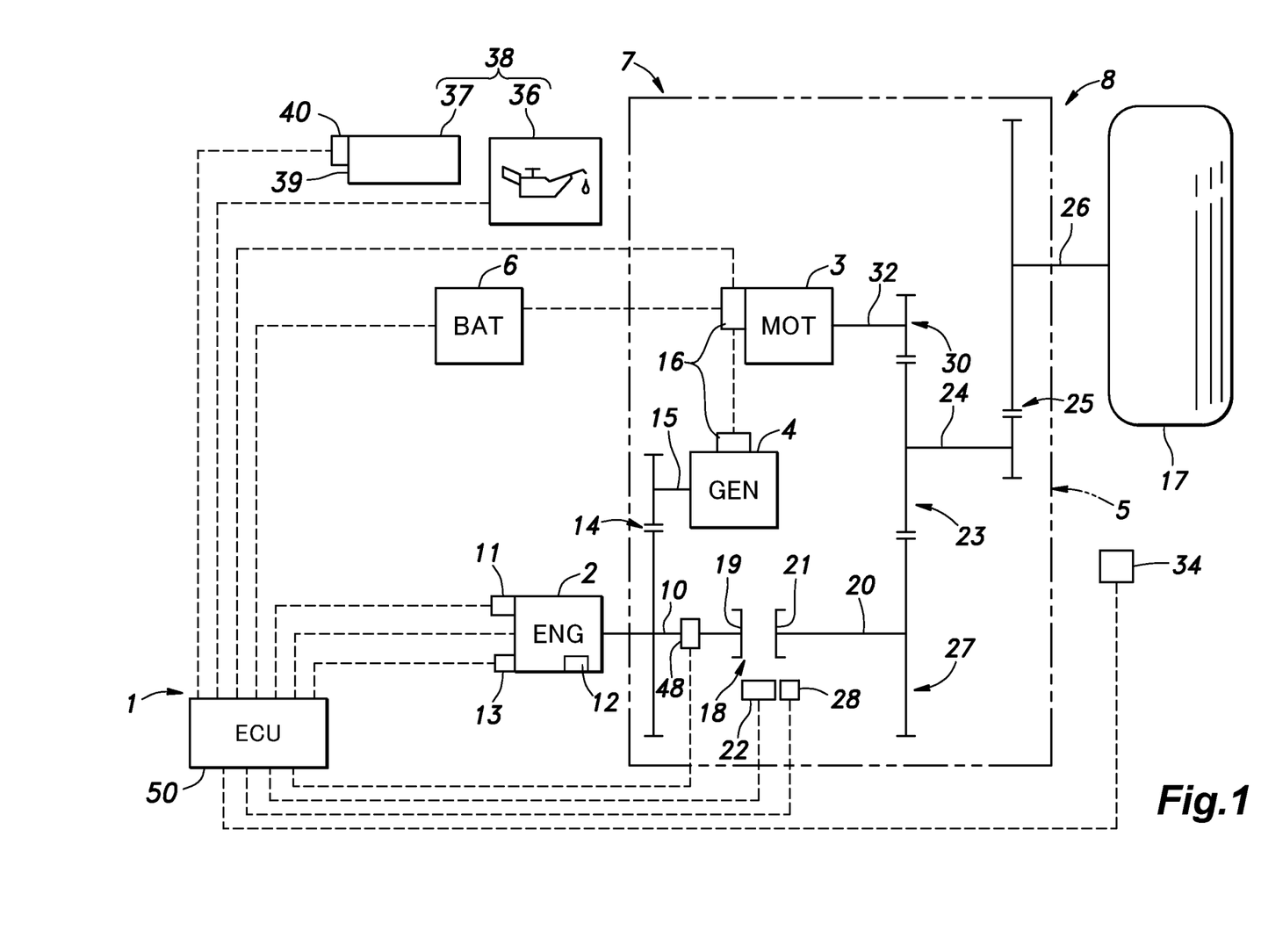
FIG. 1 is a block diagram of a hybrid vehicle according to an embodiment of the present invention.

As shown in FIG. 1, the control system 1 is mounted on a hybrid vehicle 8 that is provided with a power train 7 that includes an internal combustion engine 2, an electric motor 3, an electric generator 4 and an electric CVT 5. The vehicle 8 is further provided with a battery 6.

The control system 1 includes an engine control unit 11 that controls the output torque and rotational speed of a crankshaft 10 of the engine 2 by adjusting the throttle opening, the fuel injection timing and the ignition timing. The engine 2 is provided with an oil pump 12 which is powered by the crankshaft 10 of the engine 2, and supplies lubricating oil to various parts of the engine 2. Typically, the output of the oil pump 12 or the oil pressure increases with the rotational speed of the engine 2, and an oil pressure sensor 13 is provided in an outlet passage of the oil pump 12 to measure the oil pressure.

The crankshaft 10 of the engine 2 is connected to an output shaft that extends into the housing of the electric CVT 5, and transmits the power of the engine 2 to an input shaft 15 of the generator 4 via a set of gears 14. The control system 1 further includes a power control unit 16 for controlling the operation of the motor 3 and the generator 4.

Figure 2:
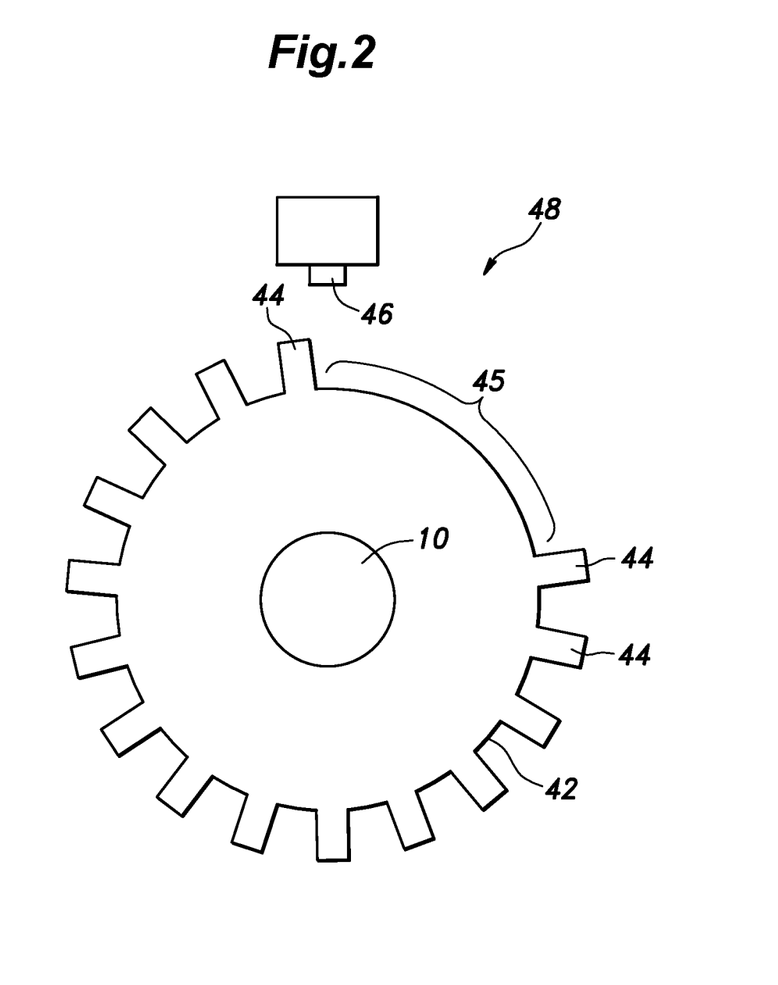
FIG. 2 is a schematic diagram of a rotary encoder.

As shown in FIG. 2, the crankshaft 10 of the engine 2 is provided with a rotary encoder 48 including a crank pulser rotor 42 in the form of a disk attached to the crankshaft 10 and provided with a plurality of projections 44 arranged along an outer periphery thereof and a pickup coil 46 attached to a fixed part of the engine 2 adjacent to a peripheral part of the crank pulser rotor 42. The projections 44 are made of magnetic material, and arranged circumferentially at a regular interval except for a vacant section 45 where no projections are formed. As the crankshaft 10 rotates, the pickup coil 46 magnetically detects the projections 44 as electric pulses.

Figure 3:
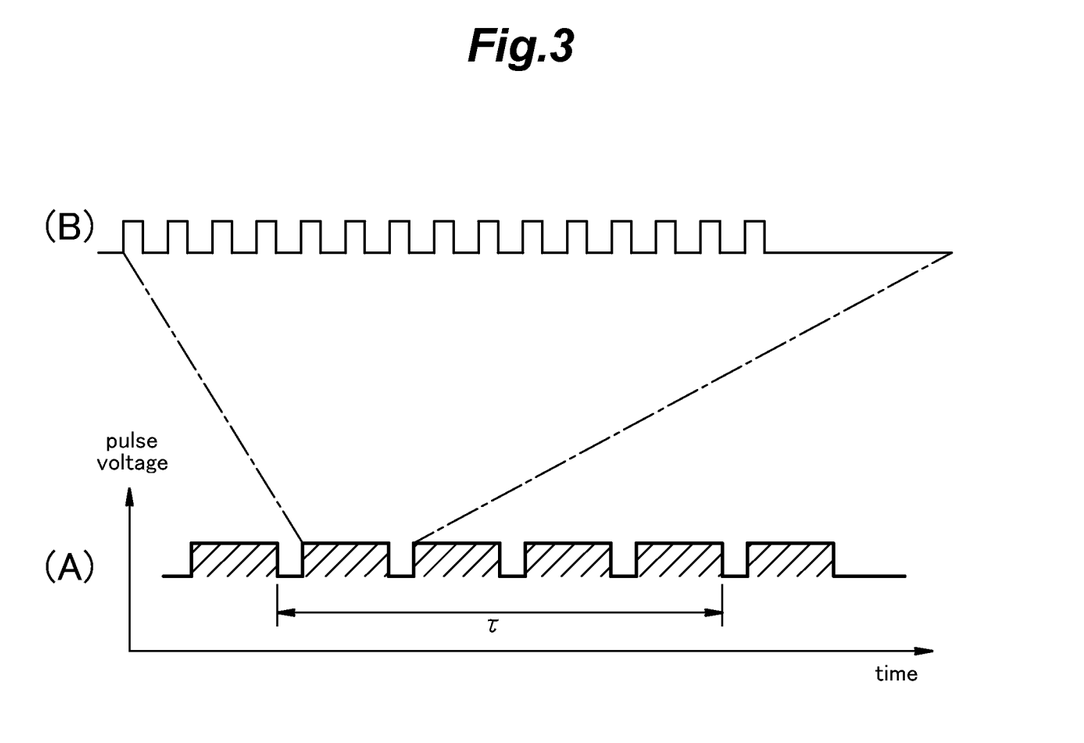
FIG. 3 is a diagram showing the output signal of the rotary encoder.

FIG. 3 shows the output voltage of the rotary encoder 48 when the crankshaft 10 is rotating at a fixed speed. An electric pulse is obtained each time one of the projections 44 passes near the detecting end of the pickup coil 46. When the vacant section 45 passes by the pickup coil 46, no electric pulse is detected. In the illustrated embodiment, there are fifteen (15) projections 44 on the crank pulser rotor 42 so that fifteen electric pulses can be detected during a single revolution of the crankshaft 10.

As shown in FIG. 1, the electric CVT 5 includes a lockup clutch 18 (direct drive clutch 18) that selectively connects the output of the engine 2 to driven wheels 17 of the vehicle 8. The lockup clutch 18 includes a first clutch plate 19 fixedly connected to the crankshaft 10 of the engine 2, a second clutch plate 21 configured to cooperate with the first clutch plate 19 and rotationally fixedly connected to a first shaft 20 (which is in turn rotatably supported by the housing of the electric CVT 5), and an actuator 22. The actuator 22 is configured to engage the clutch plates 19 and 21 with each other in response to a signal supplied thereto. The first shaft 20 is provided with a gear 27 which meshes with a gear 23 fixedly attached to a second shaft 24 (which is also rotatably supported by the housing of the electric CVT 5). The second shaft 24 is connected to a drive shaft 26 of the driven wheels 17 via a gear train 25.

The clutch 18 is further provided with a clutch sensor 28 for detecting the engagement and disengagement of the clutch plates 19 and 21.

The gear 23 on the second shaft 24 also meshes with a gear 30 fixedly attached to an output shaft 32 of the electric motor 3. The electric motor 3 is electrically connected to the electric generator 4 via the power control unit 16.

The vehicle 8 is provided with various vehicle state sensors 34 including a vehicle speed sensor and a throttle opening sensor.

The instrument panel of the vehicle 8 is provided with a MID display (multi information display) 37 which may consist of a flat panel display, and an oil pressure warning lamp 36. The oil pressure warning lamp 36 may also be incorporated in the MID display 37. The MID display 37 includes a MID display control unit 40.

The control system 1 includes an input circuit for converting an analog input into a digital signal, a central processing unit for performing a computational operation on the digital signal, an output circuit for outputting a digital signal or an analog signal produced by the central processing unit, and an electronic control unit (ECU) 50 including a storage unit for storing the program for the central processing unit, the results of the computational operation and the values of various timers. The input circuit is connected to at least the oil pressure sensor 13, the clutch sensor 28, the vehicle state sensors 34 and the rotary encoder 48.

The control system 1 counts the number of pulses produced from the rotary encoder 48 for each prescribed sampling time τ. The rotary encoder 48 produces a pulse train containing a prescribed number of pulses (15 in the illustrated embodiment) corresponding to the number of the projections 44 on the crank pulser rotor 42 for each revolution of the crankshaft 10. A blank period corresponding to the vacant section 45 on the crank pulser rotor 42 is interposed between each succeeding pair of pulse trains. The rotational speed of the engine 2 is computed for each sampling time τ by dividing the counted number of pulse trains by the sampling time τ. For instance, if the sampling time τ is 150 msec, and four pulse trains are detected during this time period, the rotational speed is (4 revolutions)/(150 msec)=26.67 revolutions/sec=1,600 rpm.

In this hybrid vehicle 8, the operation mode is selected from an EV (electric drive) mode, an HV (hybrid drive)

mode and an ENG (engine drive) mode according to a prescribed operation mode selection map incorporated in the ECU 50 by taking into account the target torque and the rotational speed of the engine and various other operating conditions of the vehicle 8. The HV mode and the EV mode may be collectively referred to as an ECVT mode.

In the illustrated embodiment, if the rotational speed of the engine 2 is lower than a prescribed lower threshold value, the EV mode is selected. If the rotational speed of the engine 2 is higher than the lower threshold value, and lower than a prescribed higher threshold value, the HV mode is typically selected. Thus, if the rotational speed is lower than the higher threshold value, the ENG mode is not selected. In the illustrated embodiment, the lower threshold value is 700 rpm, and the higher threshold value is 1,500 rpm.

The ECU 50 constantly monitors the oil pressure detected by the oil pressure sensor 13 so that an excessive drop in the oil pressure may be detected. However, when the engine 2 is not in operation (which happens frequently in a hybrid vehicle), the oil pressure becomes substantially zero, but this creates no problem, and is not required or should not to be warned or otherwise notified. Therefore, in the illustrated embodiment, the activation of the oil pressure warning is suppressed when the rotational speed of the engine is below a prescribed rotational speed threshold value. In the case of the ECVT mode, the activation of the oil pressure warning is suppressed when the rotational speed of the engine is below a first threshold value which may be selected to be equal to the lower threshold value (700 rpm). In the case of the ENG mode, the activation of the oil pressure warning is suppressed when the rotational speed of the engine is below a second threshold value which may be selected to be equal to the higher threshold value (1,500 rpm).

Figure 4:
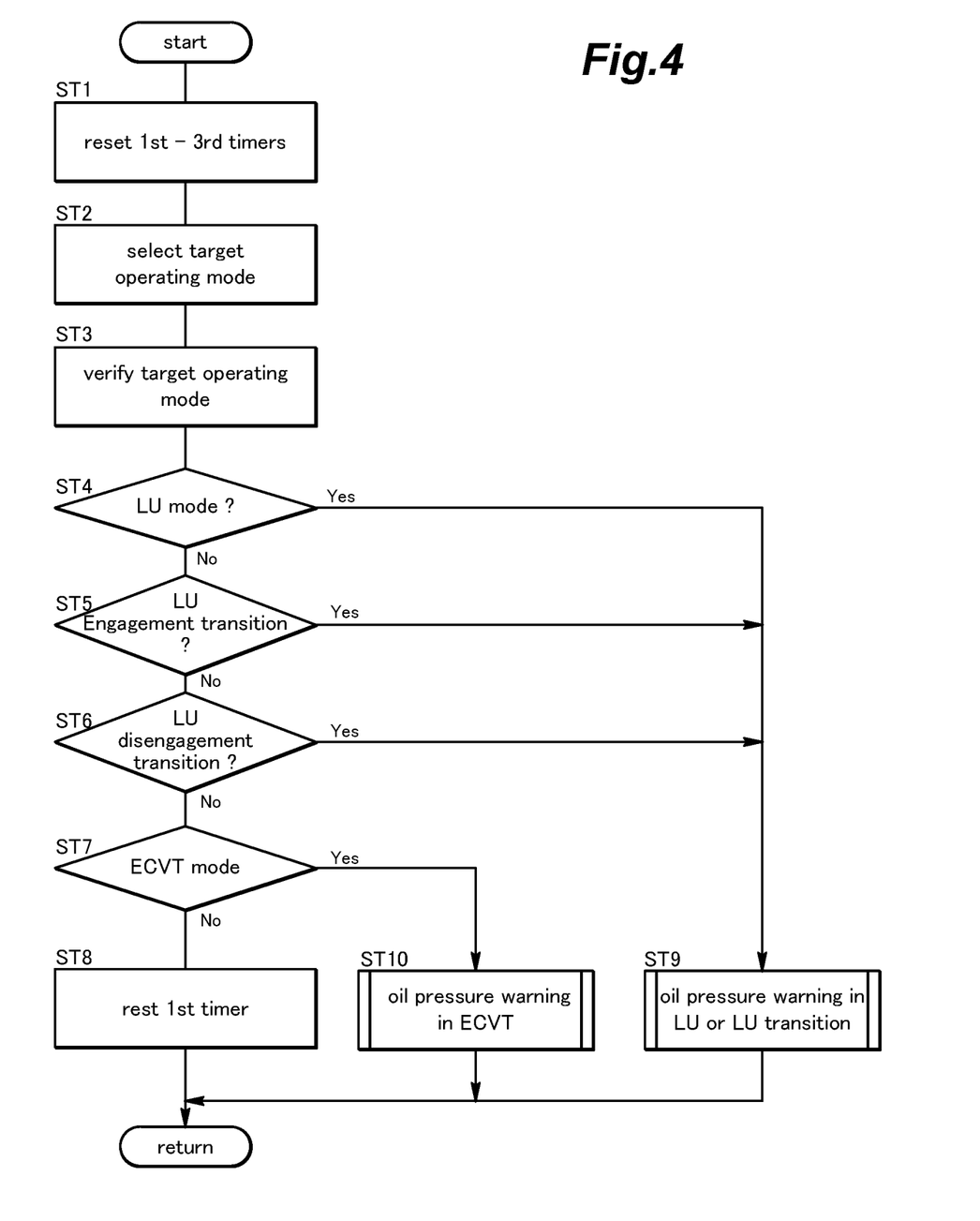
FIG. 4 is a flowchart of an oil pressure warning process.
Figure 5:
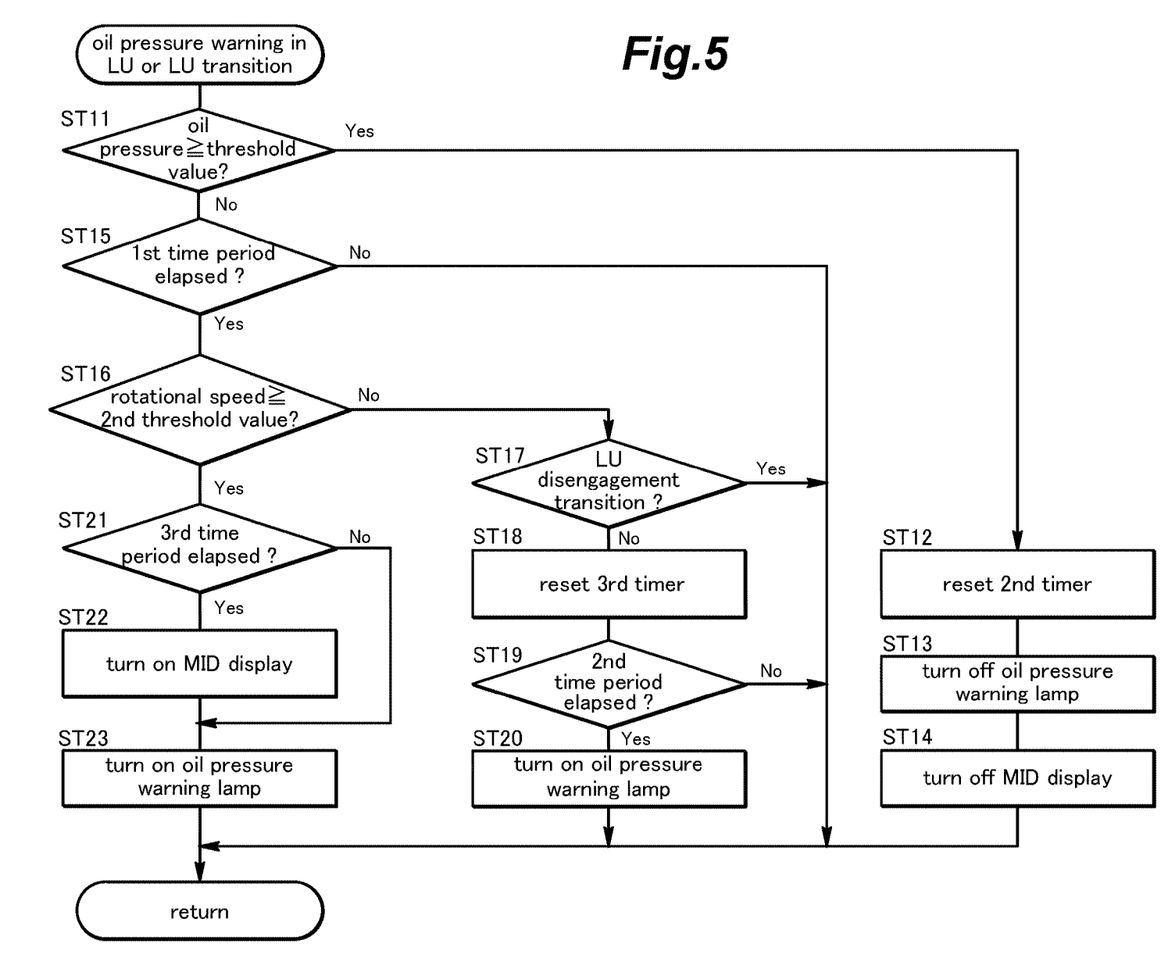
FIG. 5 is a flowchart of an LU oil pressure warning process.
Figure 6:
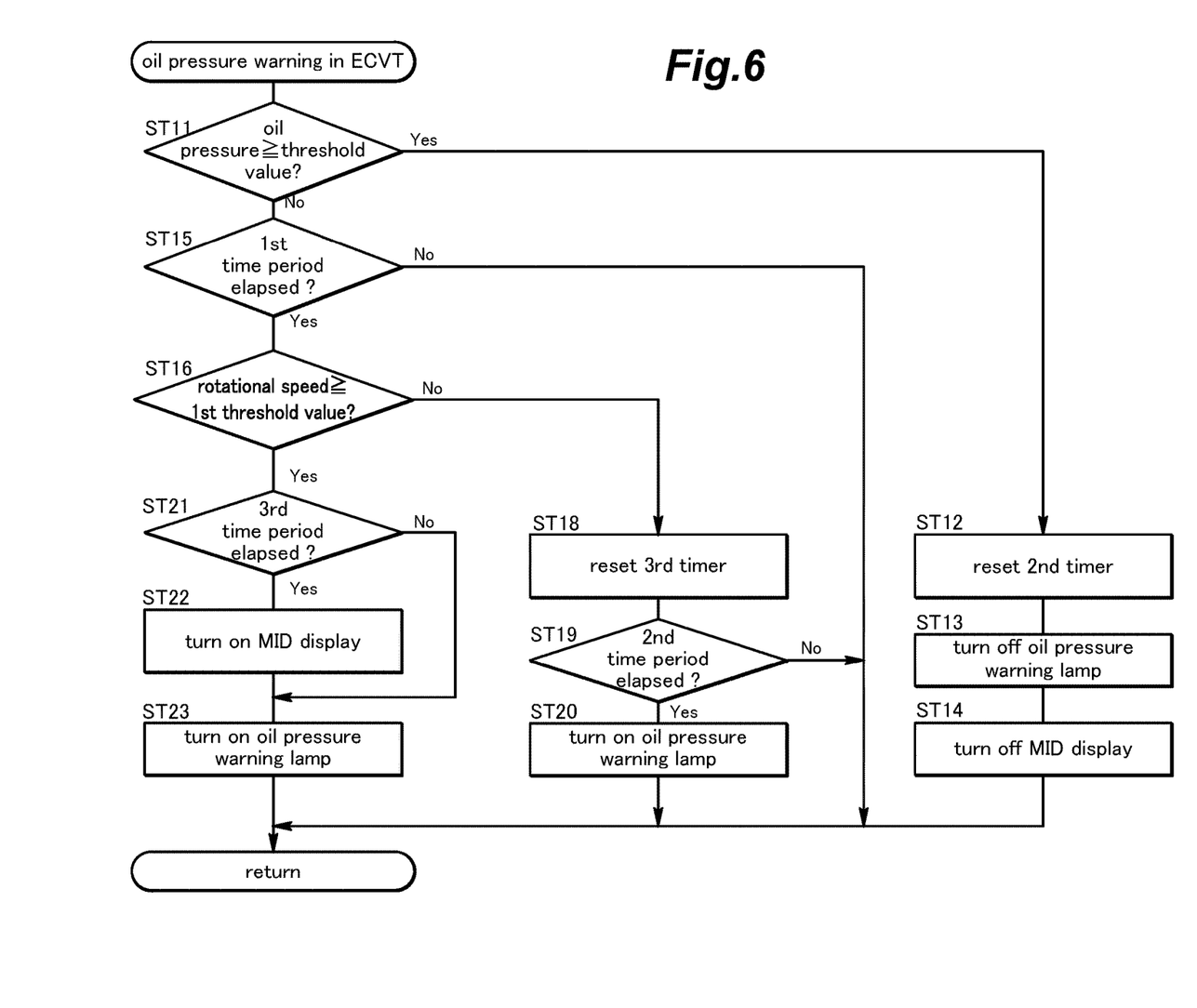
FIG. 6 is a flowchart of an ECVT oil pressure warning process.

FIGS. 4, 5 and 6 are flowcharts showing an oil pressure warning process executed by the ECU 50. Upon power up, the ECU 50 resets a first timer, a second timer and a third timer to respective initial values. The initial value of the first timer is substantially smaller than the initial values of the second timer and the third timer. In the illustrated embodiment, the initial values for the first to third timers (first to third time periods) are 2.0, 2.6 and 3.0 seconds, respectively, and an oil warning process is executed for every 0.2 seconds. Also, the ECU 50 stores the state of the lockup clutch 18 according to the signal from the clutch sensor 28.

The first timer is provided for the purpose of suppressing an improper oil pressure warning that could be activated due to a delay in the rise of the oil pressure to the threshold value when the engine is restarted. The second timer is provided for the purpose of suppressing an improper oil pressure warning that could be activated due to a temporary drop in the rotational speed of the engine in the HV mode. The third timer is provided for the purpose of suppressing an improper oil pressure warning that could be activated due to a delay in the rise of the oil pressure to the threshold value when the engine is initially started.

Referring to FIG. 4, the first to third timers are updated or counted down from the respective current values in step ST1.

A target operation mode is selected in step ST2. The target operation mode is selected from the EV (electric drive) mode, the HV (hybrid drive) mode and the (engine drive) ENG mode.

Figure 7:
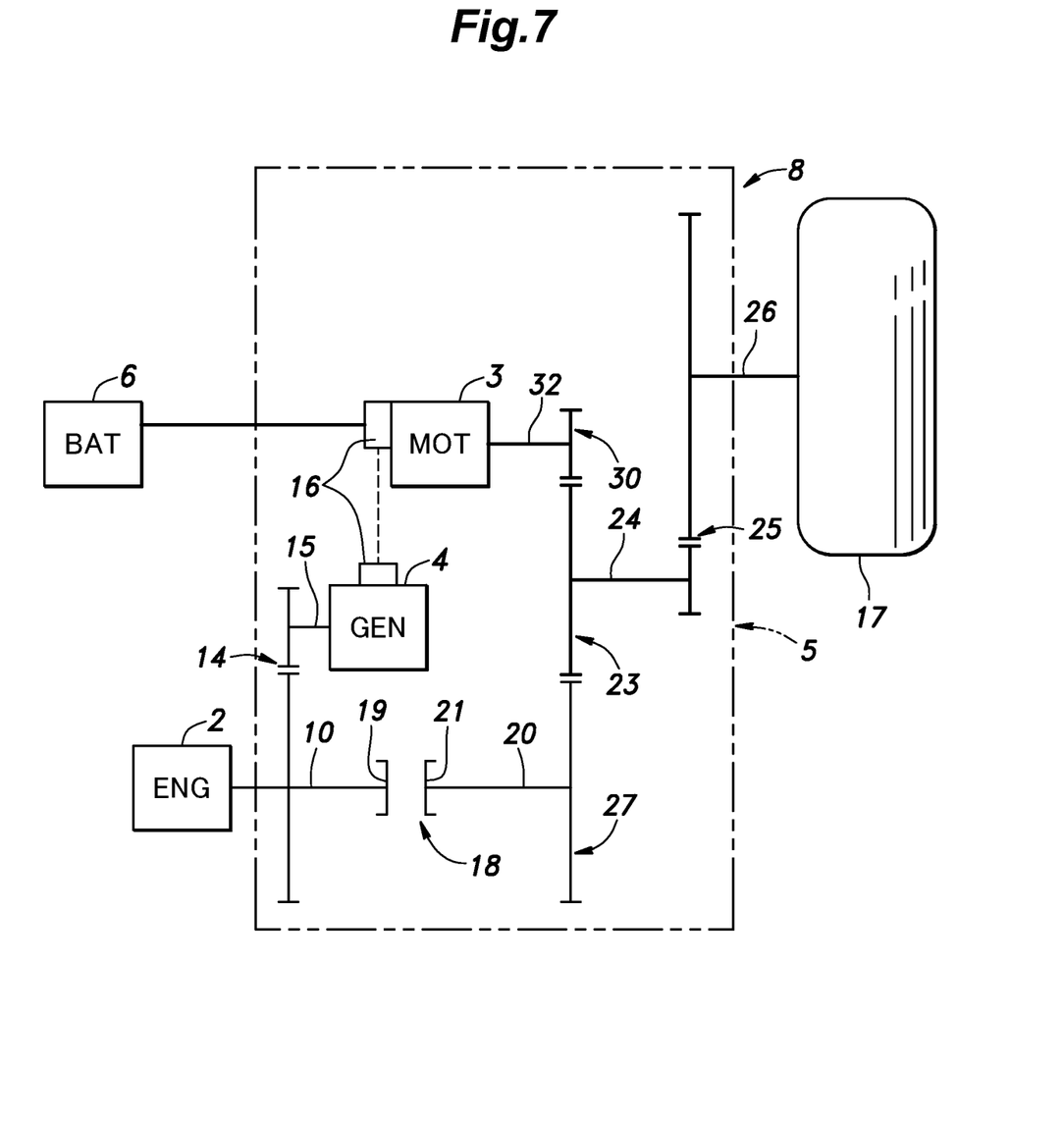
FIG. 7 is a diagram showing a power transmission flow in an EV mode.

In the EV mode, the motor 3 is driven by the battery 6, and the drive torque of the motor 3 is transmitted to the drive shaft 26 via the output shaft 32, the gear 30, the gear 23, the second shaft 24 and the gear train 25 as shown in FIG. 7. At this time, the engine 2 and the generator 4 may not be in operation.

Figure 8:
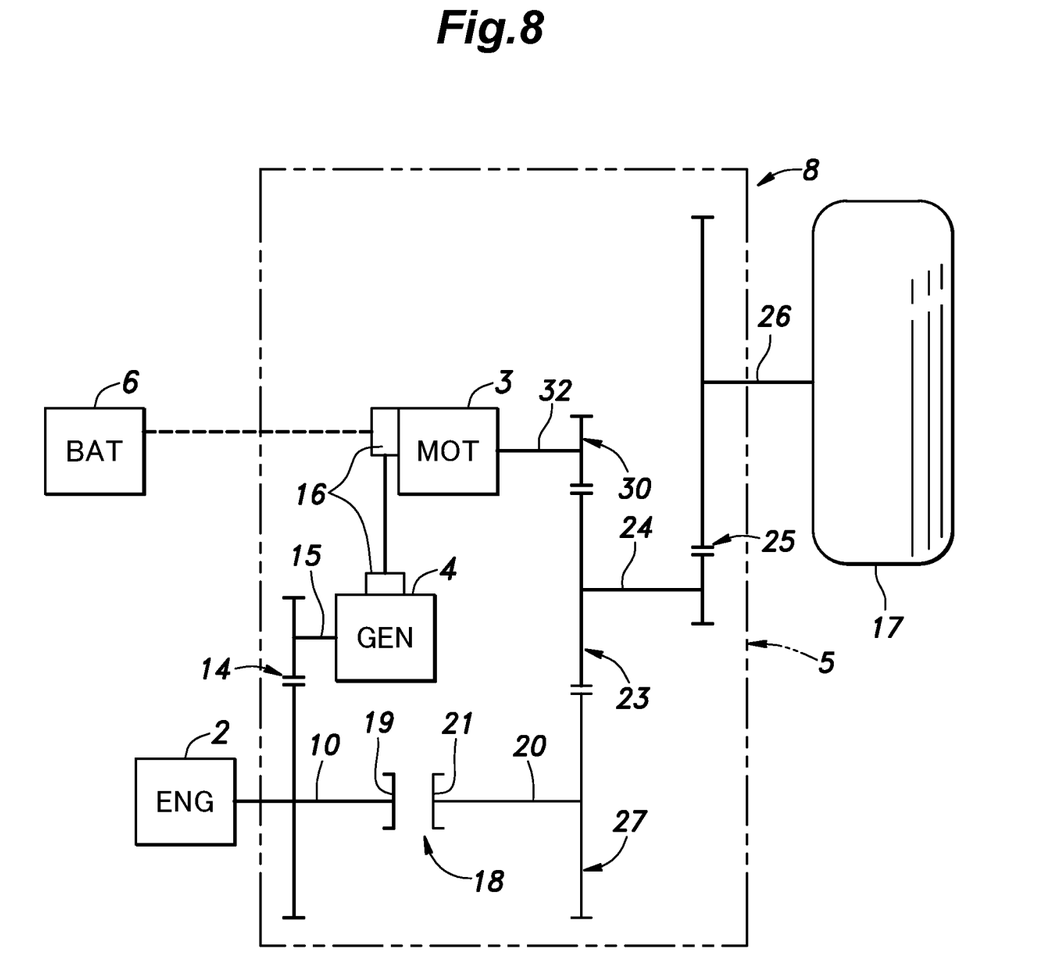
FIG. 8 is a diagram showing a power transmission flow in a HV mode.

In the HV mode, the output torque of the engine 2 is transmitted to the generator 4 to generate electric power, and the motor 3 is driven by the electric power generated by the generator 4 as shown in FIG. 8. The drive torque of the motor 3 is transmitted to the drive shaft 26 via the output shaft 32, the gear 30, the gear 23, the second shaft 24 and the gear train 25 similarly as in the EV mode. The HV mode and the EV mode may be collectively referred to as an ECVT mode.

Figure 9:
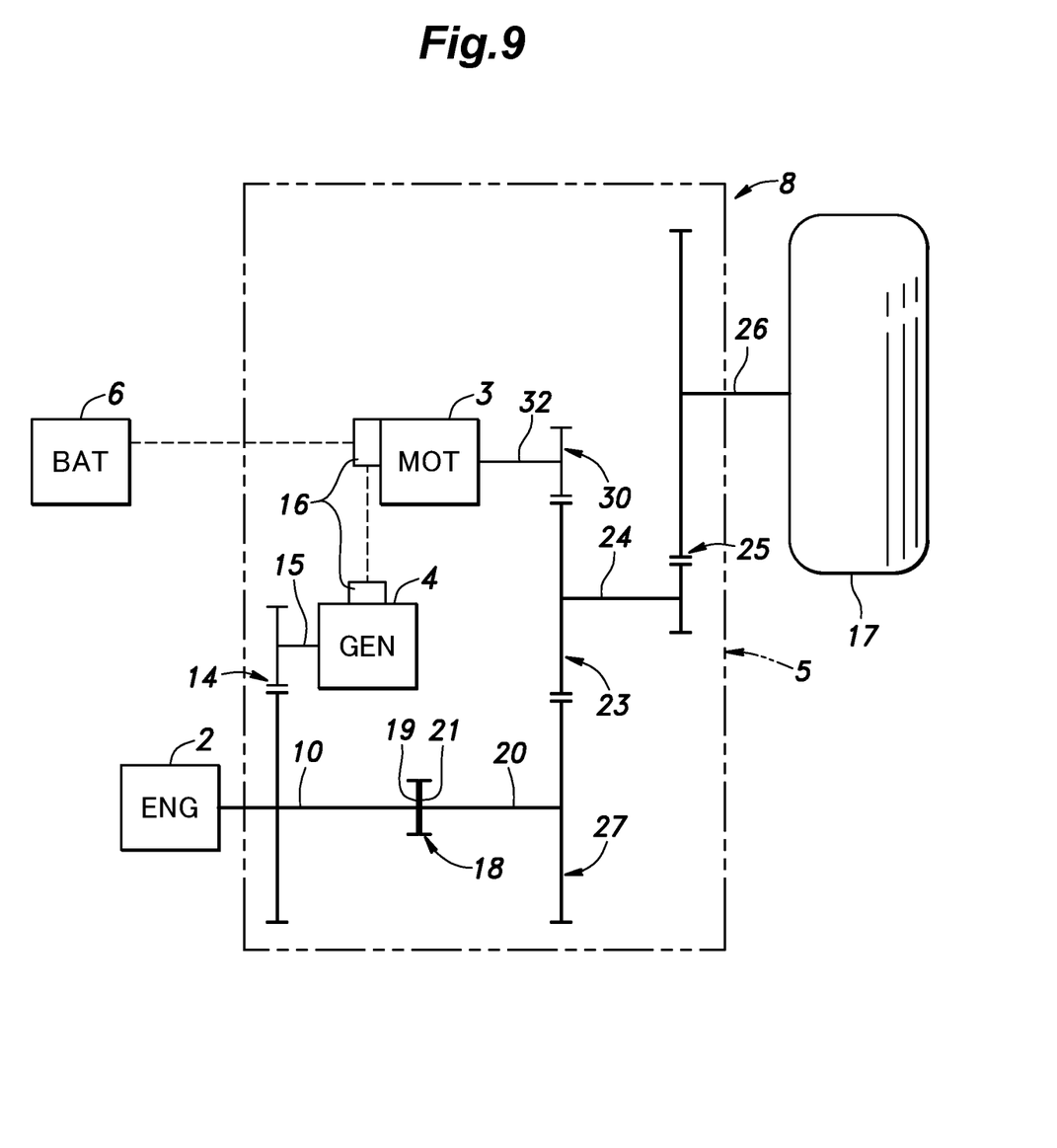
FIG. 9 is a diagram showing a power transmission flow in an ENG mode.

In the ENG mode, the torque produced from the engine 2 is directly transmitted to the drive shaft 26 as shown in FIG. 9. In the ENG mode, the crankshaft 10 is directly connected to the first shaft 20 via the lockup clutch 18, and the torque transmitted to the first shaft 20 is further transmitted to the drive shaft 26 via the gear 27, the gear 23, the second shaft 24 and the gear train 25.

In any of the operation modes, the power control unit 16 may control the operation of the motor 3 and the generator 4 so that the motor 3 regenerates electric power, the motor 3 and the generator 4 operate in an optimum fashion, and the engine 2 is operated to drive the generator 4 to charge the battery 6 depending on the particular condition of the vehicle 8. Typically, the EV mode is selected when starting off in a low load condition, and the HV mode is selected in a high load condition and in an acceleration. The ENG mode is selected when the vehicle is traveling at high speed.

In step ST2, if the rotational speed of the engine 2 is lower than the lower threshold value, the EV mode is selected. If the rotational speed of the engine 2 is higher than the lower threshold value, and lower than the higher threshold value, the HV mode is typically selected. Thus, if the rotational speed is lower than the higher threshold value, the ENG mode is not selected. In the illustrated embodiment, the lower threshold value is 700 rpm, and the higher threshold value is 1,500 rpm.

The lower threshold value may be selected to be higher than the power plant resonance frequency when the engine 2 is in operation.

The ECU 50 supplies various control signals required for the intended control actions to the PCU 16, the engine control unit 11 and the clutch actuator 22.

An operation mode verification process is executed in step ST3. The ECU 50 determines the state of the clutch 18 according to the signal from the clutch sensor 28. More specifically, the ECU 50 detects a LU mode when the two clutch disks 19 and 21 are fully engaged, a LU engagement transition mode when the two clutch disks 19 and 21 are in the process of engaging with each other, a LU disengagement transition mode when the two clutch disks 19 and 21 are in the process of disengaging from each other, and a full disengagement mode when the two clutch disks 19 and 21 are fully disengaged from each other.

The lower threshold value of the rotational speed may be considered as a minimum operational rotational speed. After determining the operation mode, the ECU 50 stores the relative position of the clutch disks 19 and 21 in the memory.

In step ST4, it is determined if the LU mode is detected. If so, the program flow advances to step ST9. Otherwise the program flow advances to step ST5.

In step ST5, it is determined if the LU engagement transition mode is detected. If so, the program flow advances to step ST9. Otherwise the program flow advances to step ST6.

In step ST6, it is determined if the LU disengagement transition mode is detected. If so, the program flow advances to step ST9. Otherwise the program flow advances to step ST7.

In step ST7, it is determined if the ECVT mode is detected. If so, the program flow advances to step ST10. Otherwise the program flow advances to step ST8.

In step ST8, the first timer is reset as the vehicle is not in any of the drive modes. In the illustrated embodiment, the value of the first timer is reset to the initial value of 2 seconds (or the first time period). Upon completion of the process of step ST8, the program flow returns to the main routine.

In step ST9, a LU oil pressure warning process for the LU mode, the LU engagement transition mode and the LU disengagement transition mode is executed as described in the following with reference to FIG. 5. In step ST10, an ECVT oil pressure warning process is executed as described in the following with reference to FIG. 6.

Referring to FIG. 5, in step ST11, the ECU 50 receives a signal from the oil pressure sensor 13, and determines if the oil pressure is equal to or higher than a prescribed oil pressure threshold value. If the oil pressure is equal to or higher than the prescribed oil pressure threshold value, the program flow advances to step ST12. Otherwise, the program flow advances to step ST15.

The oil pressure threshold value may be selected by taking into account the minimum value of the oil pressure when the rotational speed of the engine is equal to the first threshold value. In the illustrated embodiment, the oil pressure threshold value is selected as the minimum value of the oil pressure when the engine 2 is idling while taking into account the possible measurement errors of the oil pressure sensor 13.

In step ST12, the second timer is reset. In the illustrated embodiment, the value of the second timer is reset to the initial value of 3.0 seconds (or the second time period). Upon completion of step ST12, the program flow advances to step ST13.

In step ST13, an oil pressure warning lamp deactivation process is executed. In this process, if the oil pressure warning lamp 36 is turned on, the oil pressure warning lamp 36 is turned off. If the oil pressure warning lamp 36 is already turned off, the oil pressure warning lamp 36 is kept turned off. Upon completion of step ST13, the program flow advances to step ST14.

In step ST14, a MID display deactivation process is executed. In this process, if the oil pressure warning is being displayed on the MID display 40, the oil pressure warning is turned off. If the oil pressure warning is not being displayed on the MID display 40, the current state of the MID display 40 is maintained. Upon completion of step ST14, the program returns to the main routine.

In step ST11, if the oil pressure is below the oil pressure threshold value, the program flow advances to step ST15. In step ST15, it is determined if the value of the first timer is equal to or less than zero, or if the first time period corresponding to the initial value of the first timer has elapsed from the time point of initially starting the drive operation of the vehicle. If the first time period has indeed elapsed, the program flow advances to step ST16. Otherwise, the program flow returns to the main routine.

In step ST16, the ECU 50 determines if the measured value of the rotational speed acquired according to the output of the rotary encoder 48, and stored in the memory is equal to or greater than the second threshold value. If the acquired value of the rotational speed is less than the second threshold value, the program flow advances to step ST17. Otherwise, the program flow advances to step ST21. In the illustrated embodiment, the second threshold value is selected to be equal to the higher threshold value of the rotational speed of the engine.

The second threshold value is thus selected at 1,500 rpm in the illustrated embodiment.

In step ST17, it is determined if the lockup clutch 18 is in the LU engagement transition mode or not. If the lockup clutch 18 is in the LU engagement transition mode, the program flow returns to the main flow. Otherwise, the program flow advances to step ST18.

In step ST18, the third timer is reset. The third timer is reset to the initial value of 3.0 seconds (third time period). The program flow then advances to step ST19.

In step ST19, it is determined if the value of the second timer is equal to or less than zero, or if the second time period corresponding to the initial value of the second timer has elapsed since the second timer is reset last time. If the second time period has indeed elapsed, the program flow advances to step ST20. Otherwise, the program flow returns to the main routine.

In step ST20, the oil pressure warning lamp activation process is executed. In this process, if the oil pressure warning lamp 36 is turned off, the oil pressure warning lamp 36 is turned on. If the oil pressure warning lamp 36 is already turned on, the oil pressure warning lamp 36 is kept turned on. Upon completion of this process, the program flow returns to the main routine.

In step ST16, if the measured value of the rotational speed acquired according to the output of the rotary encoder 48, and stored in the memory is equal to or greater than the second threshold value, the program flow advances to step ST21.

In step ST21, it is determined if the value of the third timer is equal to or less than zero, or it is determined if the third time period corresponding to the initial value of the third timer has elapsed. If the third time period has indeed elapsed since the third timer is reset last time, the program flow advances to step ST22. Otherwise, the program flow advances to step ST23.

In step ST22, the MID display activation process is executed. In this process, if the oil pressure warning is not being displayed on the MID display 40, the oil pressure warning is turned on. If the oil pressure warning is already being displayed on the MID display 40, the current state of the MID display 40 is maintained. Upon completion of step ST22, the program advances to step ST23.

In step ST23, the oil pressure warning lamp activation process is executed (similarly as in step ST20). Upon completion of the process of step ST23, the program flow returns to the main routine.

The oil pressure warning process in the ECVT mode mentioned earlier in conjunction with step ST7 is described in the following with reference to FIG. 6.

As shown in FIG. 6, the ECVT oil pressure warning process differs from the LU oil pressure warning process in regards to two points. Firstly, if the measured value of the rotational speed acquired according to the output of the rotary encoder 48 is equal to or greater than the first threshold value (instead of the second rotational speed) in step ST16, the program flow advances to step ST21. Secondly, the oil pressure warning process in the ECVT mode does not contain step ST17. If the measured value of the rotational speed acquired according to the output of the rotary encoder 48 is less than the first threshold value in step ST16, the program flow advances to step ST18.

The mode of operation of the control system is described in the following. Table 1 summarizes the timings of activating the oil pressure warning lamp 36 and the MID display 37 when any of the LU mode, the LU engagement transition mode and the LU disengagement transition mode is detected according to the control flow illustrated in FIGS. 4 and 5.

TABLE 1

|  | oil pressure value ≥ threshold value | oil pressure value < threshold value | | |
|---|---|---|---|---|
|  |  | measured rpm ≥ 2nd threshold value | measured rpm < 2nd threshold value | |
|  |  |  | LU disengagement transition | LU or LU engagement transition |
| oil pressure warning lamp | off | on (after elapsing of 1st time period from engine restart) | off | on (after elapsing of 2nd time period from measured rpm < 2nd threshold value) |
| MID display | off | on (after elapsing of 1st time period from engine restart & 3rd time period from engine start) | off | off |

Table 2 summarizes the timings of activating the oil pressure warning lamp 36 and the MID display 37 when the ECVT mode is detected according to the control flow illustrated in FIGS. 4 and 6.

TABLE 2

|  | oil pressure value ≥ threshold value | oil pressure value < threshold value | |
|---|---|---|---|
|  |  | measured rpm ≥ 1st threshold value | measured rpm < 1st threshold value |
| oil pressure warning lamp | off | on (after elapsing of 1st time period from engine restart) | on (after elapsing of 2nd time period from measured rpm < 1st threshold value) |
| MID display | off | on (after elapsing of 1st time period from engine restart & 3rd time period from engine start) | off |

As can be seen from Tables 1 and 2, the oil pressure warning lamp 36 and the MID display 37 are turned off when the oil pressure value is equal to or greater than the oil pressure threshold value. When the measured rotational speed is equal to or higher than the first threshold value (or the second threshold value), and the oil pressure value is less than the oil pressure threshold value, the oil pressure warning lamp 36 and the MID display 37 are turned on after elapsing of the first time period set on the first timer (or after elapsing of 2 seconds from the start of the drive operation of the vehicle). Thus, the oil pressure warning lamp 36 and the MID display 37 are enabled to warn the vehicle operator of the drop in the oil pressure in a stable manner.

Figure 10:
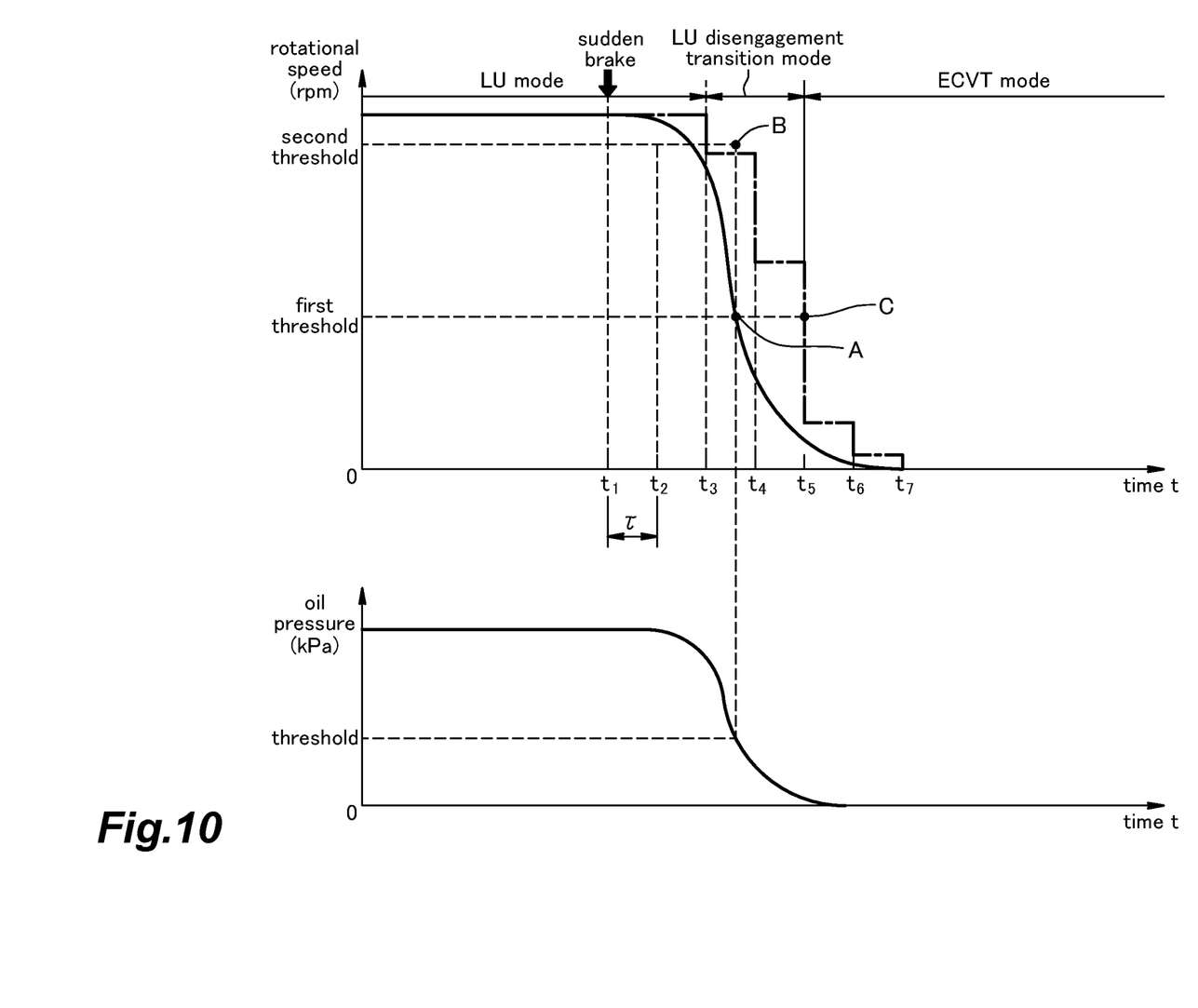
FIG. 10 is a time chart showing a time history of an oil pressure warning process when a sudden brake is applied.

The mode of operation of the vehicle 8 when a sudden braking has taken place is described in the following with reference to the time chart shown in FIG. 10. When the vehicle is operating in the LU mode, and the engine is in operation (t<t1), pulse trains of the crank pulses are continuously obtained from the rotary encoder 48.

The rotational speed of the engine 2 starts sharply dropping when a sudden brake is applied to the vehicle 8 at time t=t1. At the same time, the ECU 50 switches the target operation mode from the ENG mode to the ECVT mode. As a result, the disengagement of the lockup clutch 18 is initiated, and the operation mode changes from the LU mode to the LU disengagement transition mode. During the LU disengagement transition mode, the engine continues to operate, and the ECU 50 measures the rotational speed of the engine 2 at each of discrete time points t1-t7 (each separated from the preceding time point by τ) according to the history of the crank pulse train measurement preceding the current time point.

More specifically, when a sudden brake is applied, the ECU 50 acquires the measured value of the rotational speed with a certain time delay τ. Therefore, the actual rotational speed may be lower than the measured rotational speed. In FIG. 10, the sudden braking starts at time point t1, and the actual rotational speed continuously drops up to time point t7. The oil pressure falls below the threshold value at time point tp which is located between time points t3 and t4 as indicated by point A in FIG. 10. Thus, if the rotational speed of the engine is detected without any time delay, because the rotational speed is lower than the first threshold value, the activation of the pressure warning is properly suppressed even with a conventional arrangement.

However, in reality, the measured rotational speed changes in a stepwise manner following the actual rotational speed with some delay. Therefore, according to the conventional arrangement, at time point tp, the measured rotational speed is higher than the first threshold value as indicated by point B in FIG. 1. Therefore, the pressure warning is erroneously activated as a case of a genuine drop in oil pressure.

However, according to the illustrated embodiment, the threshold value for the rotational speed for suppressing the activation of the oil pressure warning is raised to the second threshold value which is substantially higher than the first threshold value. Therefore, at time point tp, the detected rotational speed is lower than the second threshold value so that the activation of the pressure warning is properly suppressed.

Thus, according to the control system 1 of the illustrated embodiment, the threshold value is changed depending on the state of the lockup clutch as discussed above so that the erroneous activation of the oil pressure warning can be avoided. More specifically, in the illustrated embodiment, the threshold value of the rotational speed for suppressing the oil pressure warning is set at the second threshold value in the LU mode, the LU engagement transition mode and the LU disengagement transition mode, and at the first threshold value which is substantially lower than the second threshold value in the ECVT mode.

Furthermore, in the illustrated embodiment, a certain time delay is provided in detecting the oil pressure when the engine is initially started and restarted during the operation of the vehicle by using the first timer and the third timer so that an erroneous detection of an oil pressure drop during an unstable condition of the engine can be avoided. Also, the second timer is used for suppressing an erroneous detection of an oil pressure drop in the case of a pressure drop of a short time duration, instead of a genuine case of an oil pressure drop.

The first timer is also useful in preventing an erroneous activation of the oil pressure warning when starting up the engine. When the engine is started up, the oil pressure may not rise above the threshold value before the rotational speed increases beyond the first threshold value.

In the foregoing embodiment, the oil pressure warning is provided by the oil pressure warning lamp 36 and the MID display 37. However, other modes of warning such as an acoustic warning may be used in addition or instead.

The various threshold values for the rotational speed of the engine in the foregoing embodiment are given as an example, and can be varied freely without departing from the spirit of the present invention. Typically, the first threshold value may range between the cranking rotational speed of the engine and the idle rotational speed of the engine. The second threshold value may be higher than the first threshold value, and may range between 1,000 rpm and 2,000 rpm.

Although the present invention has been described in terms of a preferred embodiment thereof, it is obvious to a person skilled in the art that various alterations and modifications are possible without departing from the spirit of the present invention.

The invention claimed is:

1. A control system for a hybrid vehicle, the hybrid vehicle being configured to operate in a direct drive mode where an output of an internal combustion engine is directly transmitted to a driven wheel via a lockup clutch and a hybrid drive mode and/or an electric drive mode where the lockup clutch is disengaged, and an output of an electric motor is transmitted to the driven wheel depending on an operating state of the vehicle including a rotational speed of the engine, the control system comprising:
   an oil pressure sensor for detecting a pressure of lubricating oil for the engine;
   a rotary encoder for detecting the rotational speed of the engine;
   a clutch sensor for detecting a state of the lockup clutch; and
   a warning unit for providing a visual and/or acoustic warning to a vehicle operator;
   the control system being configured to:
     activate the warning unit when the oil pressure detected by the oil pressure sensor is below a prescribed oil pressure threshold value and a detected rotational speed value of the rotational speed of the engine detected by the rotary encoder is equal to or higher than a first rotational speed threshold value in the direct drive mode, and
     activate the warning unit when the oil pressure detected by the oil pressure sensor is below the prescribed oil pressure threshold value and the detected rotational speed value of the rotational speed of the engine detected by the rotary encoder is equal to or higher than a second rotational speed threshold value higher than the first rotational speed threshold when the clutch sensor detects the transition from the direct drive mode to the hybrid or electric drive mode.

2. The control system according to claim 1, wherein the rotational speed threshold value is a first threshold value when the lockup clutch is fully disengaged, and the second threshold value higher than the first threshold value when the lockup clutch is fully engaged, being engaged and being disengaged.

3. The control system according to claim 2, wherein the hybrid vehicle is configured to stop the engine when the rotational speed of the engine falls below a prescribed lower threshold value, the first threshold value being substantially equal to the lower threshold value.

4. The control system according to claim 3, wherein the hybrid vehicle is configured such that the lockup clutch is engaged when the rotational speed of the engine is equal to or higher than a prescribed higher threshold value and is disengaged when the rotational speed of the engine is lower than the higher threshold value, the second threshold value being substantially equal to the higher threshold value.

5. The control system according to claim 1, further comprising a first timer for suppressing the warning until a first time period has elapsed from a time of a restart of the engine.

6. The control system according to claim 1, further comprising a second timer for suppressing the warning until a second time period has elapsed from a time of detecting a drop of the oil pressure below the oil pressure threshold value.

7. The control system according to claim 1, further comprising a third timer for suppressing the warning until a third time period has elapsed from a time of a startup of the engine.

* * * * *